US010645117B2

(12) United States Patent
Vargas Gonzalez (10) Patent No.: US 10,645,117 B2
(45) Date of Patent: May 5, 2020

(54) SYSTEMS AND METHODS TO DETECT AND NOTIFY VICTIMS OF PHISHING ACTIVITIES

(71) Applicant: Easy Solutions Enterprises Corp., Doral, FL (US)

(72) Inventor: Javier Fernando Vargas Gonzalez, Bogota D.C. (CO)

(73) Assignee: Easy Solutions Enterprises Corp., Doral, FL (US)

( * ) Notice: Subject to any disclaimer, the term of this patent is extended or adjusted under 35 U.S.C. 154(b) by 143 days.

(21) Appl. No.: 15/794,763

(22) Filed: Oct. 26, 2017

(65) Prior Publication Data

US 2019/0132356 A1 May 2, 2019

(51) Int. Cl.
*H04L 29/06* (2006.01)

(52) U.S. Cl.
CPC ...... *H04L 63/1483* (2013.01); *H04L 63/1425* (2013.01)

(58) Field of Classification Search
CPC .......................... H04L 63/1483; H04L 63/1425
See application file for complete search history.

(56) References Cited

U.S. PATENT DOCUMENTS

| 8,595,058 B2 | 11/2013 | Fordyce, III et al. | |
| 2007/0033639 A1* | 2/2007 | Goodman | H04L 63/1416 726/2 |
| 2013/0145425 A1* | 6/2013 | Shen | H04L 63/126 726/3 |
| 2014/0337089 A1 | 11/2014 | Tavares | |
| 2015/0281244 A1 | 10/2015 | Wen | |
| 2017/0078286 A1* | 3/2017 | Hunt | H04L 63/1483 |
| 2017/0195293 A1* | 7/2017 | Dahan | H04L 63/0281 |
| 2018/0063190 A1* | 3/2018 | Wright | H04L 63/1425 |

FOREIGN PATENT DOCUMENTS

| JP | 2004302764 | 10/2004 |
| WO | 2016083987 | 6/2016 |

OTHER PUBLICATIONS

International Search Report and Written Opinion, Int. Pat. App. No. PCT/US2018/057024, dated Feb. 7, 2019.

* cited by examiner

*Primary Examiner* — Hee K Song
(74) *Attorney, Agent, or Firm* — Greenberg Traurig (57) ABSTRACT

Systems and methods to detect the identities of victims of phishing activities, in which embedding, in an item, an element having a reference to a server, is embedded in an item (e.g., a webpage or a mobile application) that may be copied by attackers. When used on a user computer, the element generates a request to the server. Based on the request, the server identifies a user of the element embedded in the item or a copy of the item. Based on uses of the element, the server tracks a history of the user using the item or the copy of the item. In response to a determination that the element is currently being used by the user in the item and the history indicates that the user has used the copy of the item, the server identifies the user as a victim of the copy of the item.

17 Claims, 3 Drawing Sheets

SYSTEMS AND METHODS TO DETECT AND NOTIFY VICTIMS OF PHISHING ACTIVITIES

FIELD OF THE TECHNOLOGY

At least some embodiments disclosed herein relate to information security in general and more particularly but not limited to phishing attacks.

BACKGROUND

Phishing attacks typically involve copying a webpage of a website and hosting the copied webpage on a phishing site, with or without modification, so that the phishing site appears the same or similar to the original website. A victim is tricked into visiting the phishing site and submitting sensitive information, such as login credentials, banking passwords, and credit card information, to the phishing site, with the false impression of submitting the sensitive information to the original website.

Phishing attacks constitute a major security concern and leads to heavy investments in prevention, detection and takedown of such attacks.

Prevention and mitigation of phishing usually focus on detecting and taking down attacks in an expedited fashion. However, many phishing campaigns are designed as opportunistic predators that attempt to obtain a large number of victims in small periods of time. A typical time window between the deployment of a phishing attack and its takedown may be large enough for the phishing campaign to generate some victims. Many phishing pages are active only for a short period of time (e.g., approximately three days, with the majority lasting less than a day). It is a challenge to identify and contact the victims in order to avoid future defrauding.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least one embodiment disclosed herein provides a system that embeds a phishing detector in a webpage to enable automated detection of the phishing activities and automated notification of the victims of the phishing activities. When the webpage is loaded in a web browser, the phishing detector identifies the source of the webpage and/or the destination of the data being submitted to via the webpage. Based on the source and/or destination, the phishing detector determines whether the user of the webpage is interacting with the original website of the webpage, or a suspected phishing site. The phishing detector identifies the user based on the information submitted via the webpage, the user identity information stored in the browser cookie, and/or the software and/or hardware fingerprint of the user computer. The fingerprint can be constructed based on attributes such as an internet protocol (IP) address of the user device, a geolocation of the IP address, a browser identifier of the user device, a language of the user device, an identifier of a platform of the user device, and an identifier of an operating system of the user device.

After the user has visited a suspected phishing site and then visits the original website, the phishing detector causes the notification of the previous visit to the suspected phishing site, which can prompt the user to take corrective actions, such as changing login credentials, reset banking passwords, report stolen credit card information, etc.

The phishing detector provides a website with a tool that allow them to precisely identify users who have previously visited phishing sites and whom may be defrauded in the future. Once a user has been identified the website can deploy targeted mitigation measures which may include request the reset of credentials, trigger second factor authentication or any other mitigation action preferred by the website.

In a similar way, a phishing detector can be embedded in a mobile application (or other applications) to identify victims of phishing attacks that are implemented using copies of the mobile application (or other applications) to trick the victims to submit sensitive information to a phishing server, instead of to a legitimate server.

In a method to detect users that have potentially fallen victim of phishing scams, one or more webpages serviced by one or more web servers includes a set of elements arranged in such a way that when a criminal copies any page with malicious purposes, those elements act as beacons that not only report the existence of an unauthorized copy, but allow the legitimate holder of the page to identify users that have visited unauthorized copies.

For example, a portal configured to use such a method delivers a fully functional HTML page which includes a set of elements that are embedded in the page so that when an attacker copies the page, the set of elements are also copied and serve as sensors to detect the operation of unauthorized copies of the portal. Sensor elements can be functional JavaScript code, browser-helper elements, CSS elements, videos, images, fonts or any other element that can be used to directly or indirectly contact the original web portal.

Preferably, the sensor elements integrate the functionality of sensing the existence of the unauthorized copies and the construction of the look and feel of the webpage and/or the functionality of the webpage, such that the sensor elements cannot be easily separately from other elements of the webpage for removal without introducing differences or distortions that can be easily detected by the users.

For example, when a sensor element is fetched for a webpage, the legitimate web servers identify the device being used to fetch the sensor element; and the address of the webpage that is requesting the sensor element is recorded. Therefore, whenever a user visits an unauthorized copy of the webpage the legitimate holder of the page can be notified of what device has been used to visit the webpage that is hosted on potentially dangerous sites; and next time the same device visits the legitimate page its user will be identified as a potential victim and mitigation procedures can be started.

Some examples discussed herein relate to the detection and identification of counterfeit web applications and potential victims. The very same technique can also be applied for detection and identification of counterfeit mobile applications and their victims. For example, sensor code can be embedded into the code of the mobile application so that when a criminal copies the mobile application, the sensor-code will report to the legitimate servers to track devices running the copied mobile application and their users as potential victims.

To generate counterfeit web content, such as a phishing site, it is a common practice for attackers to simply copy the basic HTML code of the original, legitimate, targeted site and keep the resources used in the HTML code pointing to the legitimate site. Attackers interested in stealthier deployments may perform a full copy of the site to be impersonated, downloading every resource needed to render the page and hosting them in their own servers. In both cases, the attacker would be copying directly or indirectly functional parts of the legitimate page, opening a window of opportunity to implement elements that can be used to track rogue copies of the site as well as to identify its visitors.

For example, one or more elements can be embedded in a webpage and such configured that once the webpage is copied, the elements contact the legitimate servers and enable the tracking of visitors when the elements are loaded in the copy of the webpage. Such elements can be referred to as sensor elements, beacons, or phishing detectors. Such elements may be a script (e.g., JavaScript) for implementing an interactive and/or dynamic function of the webpage, a style sheet (e.g., Cascading Style Sheets (CSS)) for the rendering format of the webpage, a resource of the webpage, a helper object of the webpage.

For example, when a sensor element is implemented via a piece of functional script (e.g., JavaScript) that implements a function of the webpage, the script can be further configured to gather information to enrich the tracking of visitors. The execution of the script can trigger a request to a legitimate server to report the use of the script in a webpage and/or the identity of the user of the webpage. For example, the script may inspect the user identification information provided by the user to the webpage, such as the login credential, personally identifiable information, etc. In some instances, the script performs data validation for format checking for the data entered by the user in the webpage before the data is transmitted to the site from which the webpage is downloaded. In some instances, the script is used to submit the data requested by the webpage from the web browser to the site from which the webpage is downloaded. The script can be enriched to include phishing sensor functionalities that identifies the site that provides the webpage and/or the destination to which the data collected by the webpage is submitted.

However, even when there is additional phishing sensor functionality is specifically coded in the script, the arrangement of downloading the script as a resource of the webpage during the rendering of the webpage in a web browser from a predetermined server allows the server to identify the address from which the webpage is downloaded into the web browser, and certain information about the user of the webpage (such as a computer browser cookie, a fingerprint of the hardware and/or software of the user computer/browser).

The address can be used to determine whether the webpage is from a legitimated, white-listed website. If the webpage is not form a legitimated, white-listed website, the webpage is likely to be an illegitimate site.

The collected information about the user of the webpage (such as a computer browser cookie, a fingerprint of the hardware and/or software of the user computer/browser) can be used to identify the specific user. For example, the site that provides the script as a resource can plant the user device a browser cookie (e.g., a piece of information) that is accepted by the browser when the browser visits the site and that is returned by the browser when the browser revisits the site. The browser cookie can be configured to represent a user of the browser.

Alternatively, or in combination, a fingerprint of the hardware and/or software of the user computer/browser can also be used to identify the user of the browser.

In general, a webpage can use a variety of resources for the rendering of the webpage, such as a script, a style sheet, a helper object, an embedded content, such as an image, frame, applet, servlet request, or subpage. The webpage may specify a location of the resource (e.g., the script, the style sheet, the helper object, the embedded content) on a predetermined server such that when the resource is downloaded from the server for the rendering of the page, the server obtains the information about the webpage that causes the downloading of the resource and the information about the user of the webpage.

Further, the resource itself can be constructed to request one or more further resources from one or more predetermined servers, such that even if the resource itself is copied and hosted on the phishing site, the downloading of the one or more further resources for the use the resource in the webpage provides the information about the webpage that causes the downloading of the resource and the information about the user of the webpage.

For example, a stylesheet may include references to images, fonts or any other resources that causes the browser to perform requests to the one or more predetermined servers. The reference can be embedded in any part of the page content, inside a CSS file, or in inline styles in HTML tags of the webpage.

In general, requests to one or more predetermined servers can be triggered from CSS style sheets, HTML tags for resources located at the one or more predetermined servers according to references to the one or more predetermined servers inserted across the content of the page and/or the resources of the page, such that when any of the references is used in a webpage copied by the attackers, the one or more predetermined servers can detect the use of the copied webpage and the corresponding user.

When the script is further implemented with an additional sensing function in detecting the identity of the user, the victim of using an illegitimate copy of the webpage can be identified more precisely. For example, the script may inspect the login field of the webpage to determine the user name supplied by the user in using the webpage and thus identify the user based on the user name.

Similarly, the script may be configured to perform submission of data collected by the webpage and thus detect the destination of the data precisely.

In some instances, a resource for a webpage is a helper object, such as a browser plugin, a java program, embedded flash content or ActiveX or any other browser helper. The user of the helper object can trigger requests to one or more predetermined servers, which requests can also be used beacons to track the hosts of the webpage that uses the helper object and the users of these webpage.

Similar to the addition of further sensing functions to a script used by a webpage, the helper object can also be further programmed to gather information from the device being used and the user interaction with the webpage to enrich the tracking of the identities of the potential victims and the destination of the information submitted by the victims.

Other elements of a webpage or a resource of the webpage or helpers of the webpage or web browser that can be used in a similar way to trigger a request from the browser or whatever application or device is used to visit the sites, where the request can be used to identify the host of the webpage and the identity of the user of the webpage.

The elements or references embedded in the webpage can be considered as beacons. When beacons located in non-authorized copies of the legitimate portals contact the legitimate servers, details of the connection between the users of the non-authorized copies and the hosts of the non-authorized copies, as well as data gathered by the beacon or provided by the contacting application or device, can be used to keep track of the illegitimate site and to build a profile of the device, application, or user such that when the device, application, or user can be identified for risk mitigation at the time the device, application, or user visit the legitimate site.

Beacons used at legitimate portals (e.g., webpages hosted on legitimate websites) may perform the same actions as beacons used at unauthorized copies (e.g., the webpages copied with or without modification and hosted on phishing sites). Hence, the same type of information is located in response to the use of a beacon, regardless of whether the beacon is used in a legitimate copy or a rogue copy. Such an arrangement simplifies the determination of whether a device application, or user has been to a potentially hazardous site. Since the legitimate site has full control of session and login details, it can correlate the device or application to a particular user and trigger risk mitigation operations.

Building the profile of the device or application visiting the sites allows the matching of the devices seen visiting rogue sites against the ones seen at the legitimate site. The matching can be either an exact match or an approximate fuzzy match. That is, when enough mechanisms are provided by the device or application so that identifying them is a deterministic task (such as browser cookies, machine identifiers, HTML5 storage, etc.), exact matching is achieved. When no deterministic mechanisms are provided, the matching can be done by using a set of variable elements available to the legitimate servers (such as, IP addresses, IP-Geolocation, Browser Identifier, Language of the device, platform, OS, etc.); and the variable elements are used to build a fuzzy fingerprint that can be matched by using non-deterministic tools, such as locality sensitive hashing or other statistical approaches.

In one illustrative example, a legitimate website embeds a JavaScript beacon, together with a set of CSS elements referencing resources located at legitimate servers. Such legitimate servers can be the same servers hosting the original website or third-party servers providing the service of tracking and identification of victims. After an attacker copies the original page and deploys it on a phishing site, a visitor of the phishing site obtains either the unauthorized copy or the legitimate page. The web browser of the visitor executes the beacon JavaScript while the copied CSS elements are interpreted for the unauthorized copy, which triggers requests to the legitimate servers. If it's the first time this device visits either a legitimate site or the phishing site, the legitimate servers respond to the requests from the web browser with the requested resources and set a browser cookie with a unique identifier generated for the device. Subsequently, when the same device is used to visit legitimate or rogue sites with references to the legitimate servers, the legitimate servers can use the unique identifier set in the browser cookie to track/recognize the device. When the user of the device tries to login to the legitimate servers, the tracking history for the device can be examined to determine that the device has been used to visit rogue sites and therefore identify the user as a potential victim.

When the security setting of a browser prevents the set and exchange of cookies across domains, it may not be possible to track the user device via a browser cookie. In this case, environmental data of the request such as IP address, browser language, browser version, language, OS, and others can be used to construct a fuzzy identifier of the device. With such identifier, the legitimate servers can use locality sensitive hashing to estimate the likelihood of that device being previously used to visit rogue deployments.

Phishing attacks can be implemented via mobile applications where attackers copy legitimate mobile applications and modify them to include malicious code that steals sensitive data or performs unauthorized transactions, while keeping all the core section of the original application so that modified mobile application is functional and the user is able to do the same operations as he would do in the legitimate application, without noticing he is falling victim of a scam.

To detect the identities of the victims of such phishing attacks implemented via mobile applications, a mobile application can be build to include code portions that contact the legitimate servers when the application is executed. The contact with the servers can be executed during the execution of the mobile application. The contact may be randomized to prevent being detected by basic behavioral analysis. When the contact-code or beacon-code is executed, it gathers all the information necessary to build a unique or fuzzy identifier of the underlying device, such information is then posted to the legitimate server together with a fingerprint of the application running the beacon-code. The fingerprint of the application is used by the server to determine whether the application running the beacon-code corresponds to a version of its legitimate released applications or if it is only a modified copy. If the posted fingerprint does not match a valid one, the user and the device are marked as compromised and mitigation procedures can be started. Also, the next time this device is used to run the legitimate application, it can be identified and mitigation protocol applied.

Figure 1:
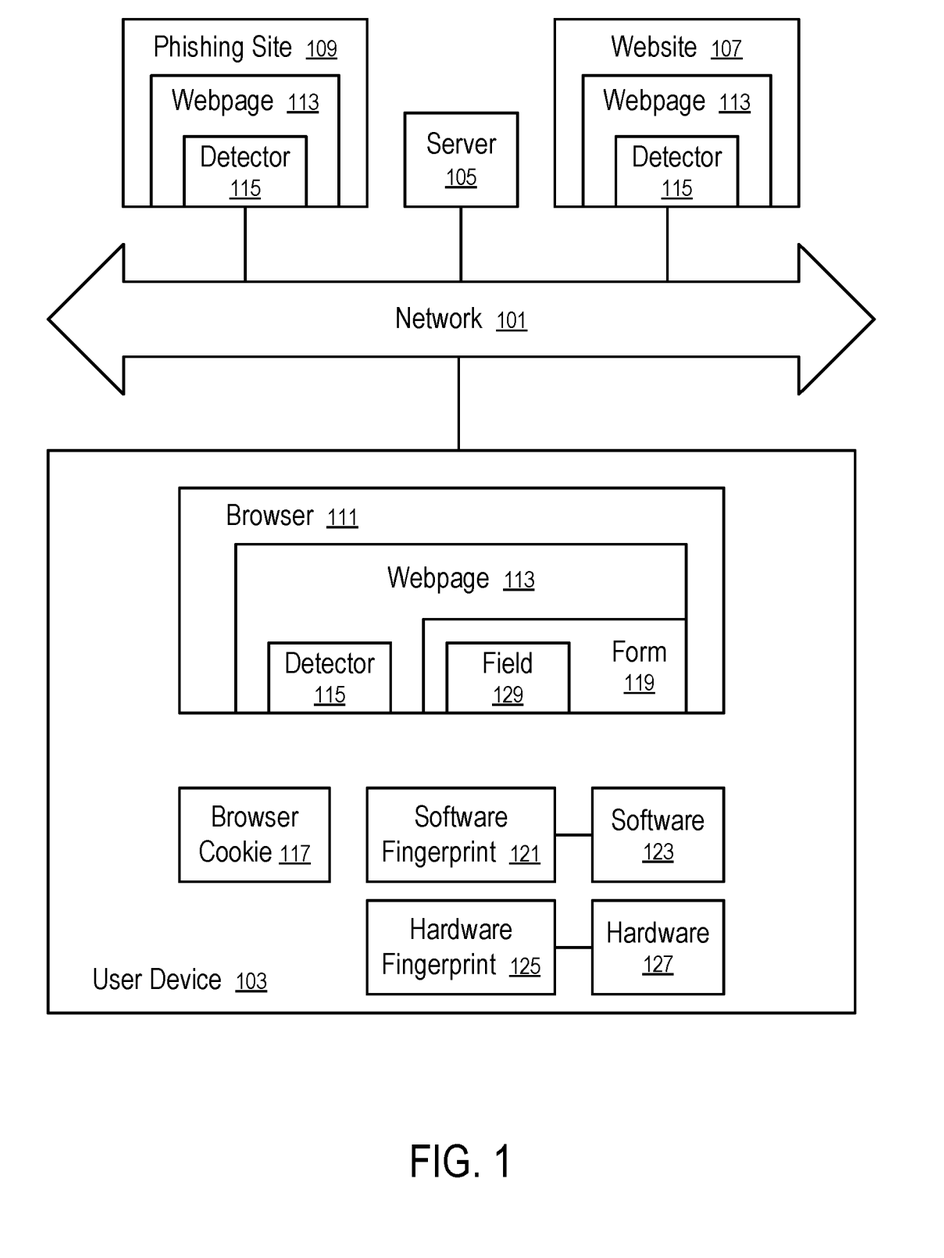
FIG. 1 shows a system configured to detect and notify victims of phishing activities according to one embodiment.

FIG. 1 shows a system configured to detect and notify victims of phishing activities according to one embodiment.

In FIG. 1, a detector (115) is embedded in a webpage (113) hosted on the website (107). The detector (115) hosted in the webpage (113) has a reference to the server (105), which may be the same as the website (107) in some implementations and may be separate from the website (107) in other implementations.

When the phishing site (109) contains a webpage (113) copied from the website (107), the webpage (113) hosts the detector (115) also. The webpage (113) hosted in the phishing site (109) may be or may not be modified, but directs user inputs to the webpage (113) to the phishing site (109), instead of to the website (107).

When the user device (103) accesses the webpage (113) over the network (101), it may obtain the web page (113) from the website (107) or the phishing site (109). Regardless of the host of the webpage (113) from which the webpage (113) is downloaded into the browser (111), the detector (115) in the webpage (113) causes a communication with the server (105) (e.g., to obtain a resource for the webpage (113) and/or to report information about the host of the webpage (113) loaded in the browser (111), which host may be the website (107) or the phishing site (109) and the information about the user of the browser (111).

For example, the user of the browser (111) can be identified via the browser cookie (117) stored by the server (105), via the fingerprint (121) of the software (123) running and/or installed on the user device (103), and/or via the fingerprint (125) of the hardware (127) of the user device (103), For example, the detector (115) may include computer instructions for the user device (103) to inspect the data fields (129) of a form (119) to be filled out by the user to submit data to the host of the webpage (113). For example, the form (119) may be a login form that requests the user to provide a user ID or a login name, which can be used to uniquely identified the user of the browser (111) showing the webpage (113). Other data fields, such as email address or phone number can also be used to identify the user.

In some implementations, the detector (115) also determines a fingerprint of the webpage (113), which allows the server (105) to determine whether the webpage (113) is a modified version. For example, when the fingerprint of the webpage (113) in the browser (111) is different from the known fingerprint of the webpage (113) hosted on the legitimated website (107)), the webpage (113) is a modified version.

The server (105) may store a whitelist of legitimate website (107). A host of the webpage (113) that is not on the whitelist and/or the webpage (113) that is a modified version can lead to a conclusion that the user of the browser (111) is a victim of phishing, especially when such a webpage (113) is used by the user to submit information.

Although FIG. 1 illustrates an example of embedding a detector (115) in a webpage (113), the detector (115) can be embedded in a mobile application to detect phishing activities and their victims in a similar way.

Figure 2:
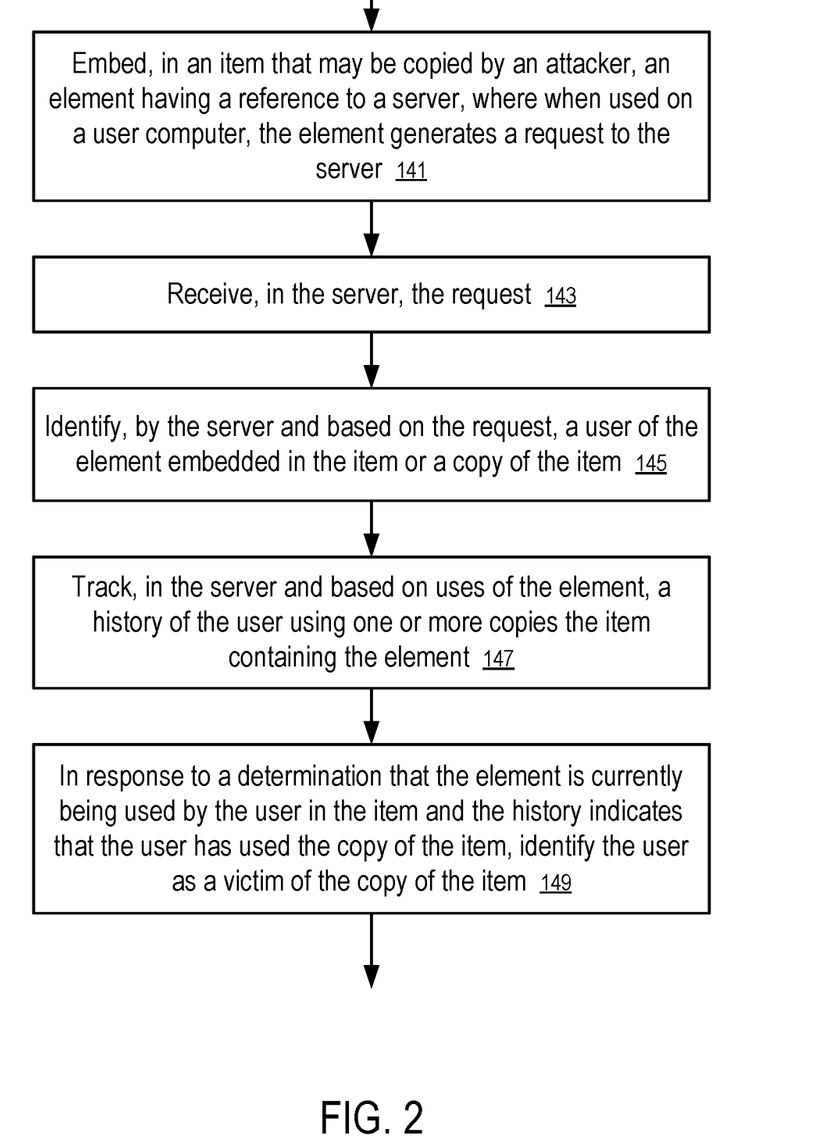
FIG. 2 shows a method configured to detect and notify victims of phishing activities according to one embodiment.

FIG. 2 shows a method configured to detect and notify victims of phishing activities according to one embodiment. For example, the method can be implemented in a system illustrated in FIG. 1.

In FIG. 2, the method includes embedding (141), in an item that may be copied by an attacker, an element having a reference to a server. When used on a user computer, the element generates a request to the server, regardless of whether the element is being hosted in the item provided by a legitimate site, or a copied of the item provided by the attacker on a phishing site.

In response to receiving (143) the request in the server, the identify (145), by the server and based on the received request, a user of the element embedded in the item that is legitimate or a copy of the item that is a phishing attack.

The method includes: tracking (147), in the server and based on uses of the element, a history of the user using one or more copies the item containing the element; and in response to a determination that the element is currently being used by the user in the item and the history indicates that the user has used the copy of the item, identify (149) the user as a victim of the copy of the item.

For example, in response to the request made via the element, the server provides a resource of the element as a response. For example, the resource and/or the element may be one of: a script; a style sheet; a browser plugin; an image; a mobile application; an applet; and a request for a servlet.

In some instances, the request identifies a host that provides the item or a copy of the item, in which the element is used in the user computer.

The server may store a whitelist of one or more legitimate hosts of the item and identify the user as a victim in response to a determination that a host of the copy is not on the whitelist.

The history of the user using the one or more copies the item containing the element can be tracked based on a browser cookie provided by the server and/or a fingerprint of the user device. The fingerprint can be constructed based on attributes of software of the user device and/or hardware of the user device, such as an internet protocol (IP) address of the user device, a geolocation of the IP address, a browser identifier of the user device, a language of the user device, an identifier of a platform of the user device, an identifier of an operating system of the user device, identifications of microprocessors of the user device, identification of memory devices of the user device, etc.

In some instances, the request generated by the embedded element includes identification information provided by the user to a hosting item of the element that is being used in the user computer. For example, the element may include computer instructions executable on the user computer to inspect content of a data field containing login credential of the user to generate the identification information. Further, the computer instructions of the element may determine an identification of a destination of the data being submitted via the hosting item used on in the user computer. The identification of the destination can be used to determine whether the destination and thus the host element are legitimate or not.

In some instances, the computer instructions of the element determine a fingerprint of the hosting item of the element that is being used in the user computer. The fingerprints can be used to determine whether the host item has been modified from a legitimate item, such as a mobile application or a web-based object hosted on a legitimate site.

Figure 3:
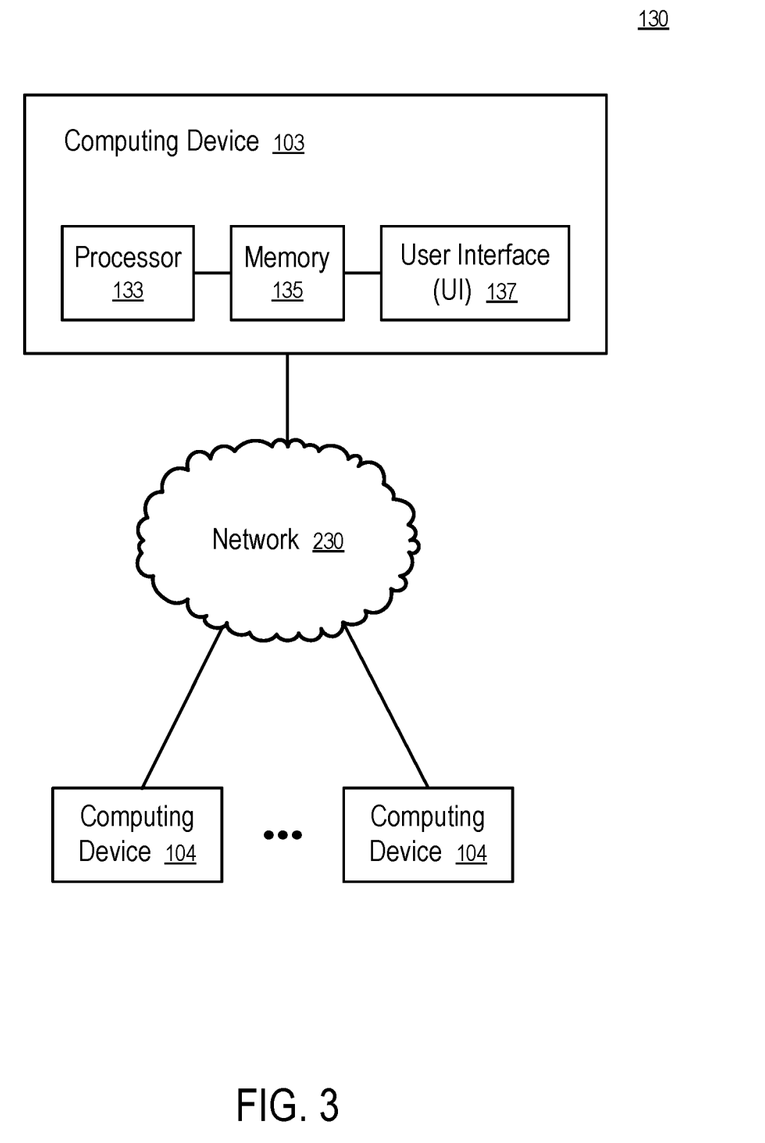
FIG. 3 is a block diagram of system which may be used in conjunction with various embodiments.

FIG. 3 is a block diagram of system which may be used in conjunction with various embodiments. While FIG. 3 illustrates various components of a computer system, it is not intended to represent any particular architecture or manner of interconnecting the components. Other systems that have fewer or more components may also be used.

In FIG. 3, the system (130) includes a computing device (103) comprising a processor (133), memory (135), and user interface (137). The computing device (103) may include any number of different microprocessors, memory components, and user interface components, and may interact with any other desired systems and devices in conjunction with embodiments of the present disclosure.

The functionality of the computing device (103), including the methods described above (in whole or in part), may be implemented through the processor (133) executing computer-readable instructions stored in the memory (135) of the computing device (103). The memory (135) may store any computer-readable instructions and data, including software applications, applets, and embedded operating code. Portions of the functionality of the methods described herein may also be performed via software operating on one or more of the other computing devices (104).

The functionality of the computing device (103) or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor (133)

retrieves and executes instructions stored in the memory (135) to control the operation of the computing device (103). Any type of processor, such as an integrated circuit microprocessor, microcontroller, and/or digital signal processor (DSP), can be used in conjunction with embodiments of the present disclosure. A memory (134) operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory (135) in any desired manner, such as in a relational database.

The computing device (103) includes a user interface (137) that may include any number of input devices (not shown) to receive commands, data, and other suitable input. The user interface (137) may also include any number of output devices (not shown) to provides the user with data, alerts/notifications, and other information. Typical I/O devices may include mice, keyboards, modems, network interfaces, printers, scanners, video cameras and other devices.

The computing device (103) may communicate with one or more client computing devices (104), as well as other systems and devices in any desired manner, including via network (101). The computing device (103) and/or client computing devices (104) may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network (101) may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

Communication among systems, devices, and components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: shipping data, package data, and/or any data useful in the operation of the system.

Various functionalities may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, Opera, or any other of the myriad software packages available for browsing the internet.

Various embodiments may operate in conjunction with any suitable operating system (e.g., Windows NT, 95/98/2000/CE/Mobile/, Windows 7/8, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

The various system components may be independently, separately or collectively suitably coupled to a network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that embodiments of the present disclosure may operate in conjunction with any suitable type of network, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may be located at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having webpages. The term "webpage" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous JavaScript And XML), helper applications, plug-ins, and the like. A server may include a web service that receives a request from a web server, the request including a URL and an IP address. The web server retrieves the appropriate webpages and sends the data or applications for the webpages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a webpage such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A method to detect phishing activities and victims, the method comprising:
    embedding, in an item, an element having a reference to a server, wherein when used on a user computer, the element generates a request to the server;
    receiving, in the server, the request;
    identifying, by the server and based on the request, a user of the element embedded in the item or a copy of the item;
    tracking, in the server and based on uses of the element, a history of the user using one or more copies the item containing the element; and
    in response to a determination that the element is currently being used by the user in the item and the history indicates that the user has used the copy of the item, identifying the user as a victim of the copy of the item,
        wherein the tracking of the history of the user using the one or more copies the item containing the element is based on matching a fingerprint of the user computer,
        wherein the fingerprint is based on attributes of least one of software of the user computer and hardware of the user computer, and
        wherein the attributes include at least one of: an internet protocol (IP) address of the user computer; a geolocation of the IP address; a browser identifier of the user computer; a language of the user computer; an identifier of a platform of the user computer; and an identifier of an operating system of the user computer.

2. The method of claim 1, further comprising: in response to the request, providing by the server a resource as a response.

3. The method of claim 2, wherein the item is a webpage; and the element is one of: a script; a style sheet; a browser plugin; an image; a mobile application; an applet; and a request for a servlet.

4. The method of claim 3, wherein the request identifies a host that provides the item or a copy of the item, in which the element is used in the user computer.

5. The method of claim 4, further comprising: storing a whitelist of one or more legitimate hosts of the item; and identifying the user as a victim in response to a determination that a host of the copy is not on the whitelist.

6. The method of claim 3, wherein the tracking of the history of the user using the one or more copies the item containing the element is based on a browser cookie provided by the server.

7. The method of claim 1, wherein the request includes identification information provided by the user to a hosting item of the element that is being used in the user computer.

8. The method of claim 7, wherein when used on the user computer, the element inspects content of a data field containing login credential of the user to generate the identification information.

9. The method of claim 7, wherein the request further includes an identification of a destination of the data being submitted via the hosting item used on in the user computer.

10. The method of claim 7, wherein the request further includes a fingerprint of the hosting item of the element that is being used in the user computer.

11. The method of claim 10, wherein the hosting item is a mobile application.

12. A non-transitory computers storage medium storing instructions configured to instruct a computing device to perform a method to detect phishing activities and victims, the method comprising:
    receiving, in a server, a request generated by a user computer using an element, wherein the element is embedded in an item and has a reference to the server;
    identifying, by the server and based on the request, a user of the element embedded in the item or a copy of the item;
    tracking, in the server and based on uses of the element, a history of the user using one or more copies the item containing the element; and
    in response to a determination that the element is currently being used by the user in the item and the history indicates that the user has used the copy of the item, identifying the user as a victim of the copy of the item,
        wherein the tracking of the history of the user using the one or more copies the item containing the element is based on matching a fingerprint of the user computer,
        wherein the fingerprint is based on attributes of least one of software of the user computer and hardware of the user computer, and
        wherein the attributes include at least one of: an internet protocol (IP) address of the user computer; a geolocation of the IP address; a browser identifier of the user computer; a language of the user computer; an identifier of a platform of the user computer; and an identifier of an operating system of the user computer.

13. A computing device, comprising:
    at least one microprocessor; and
    memory storing instructions configured to instruct the computing device to perform a method to detect phishing activities and victims, by:
        receiving, in a server, a request generated by a user computer using an element, wherein the element is embedded in an item and has a reference to the server;
        identifying, by the server and based on the request, a user of the element embedded in the item or a copy of the item;
        tracking, in the server and based on uses of the element, a history of the user using one or more copies the item containing the element; and in response to a determination that the element is currently being used by the user in the item and the history indicates that the user has used the copy of the item, identifying the user as a victim of the copy of the item, wherein the tracking of the history of the user using the one or more copies the item containing the element is based on matching a fingerprint of the user computer, wherein the fingerprint is based on attributes of least one of software of the user computer and hardware of the user computer, and wherein the attributes include at least one of: an internet protocol (IP) address of the user computer; a geolocation of the IP address; a browser identifier of the user computer; a language of the user computer; an identifier of a platform of the user computer; and an identifier of an operating system of the user computer.

14. The computing device of claim 13, wherein the element contains computer instructions executable on the user computer to inspect data content provided in a data field in a hosting item of the element and determine an identity of the user based on the data content.

15. The computing device of claim 14, wherein when executed on the user computer the computer instructions identify a destination to which the data content is submitted via the hosting item of the element.

16. The computing device of claim 14, wherein when executed on the user computer the computer instructions provide the identity of the user and information about the hosting item of the element to the server.

17. The computing device of claim 13, wherein the hosting item is one of: a webpage and a mobile application.

* * * * *